B. L. PARKES.
CULTIVATOR ATTACHMENT.
APPLICATION FILED FEB. 8, 1912.
1,126,849.
Patented Feb. 2, 1915.
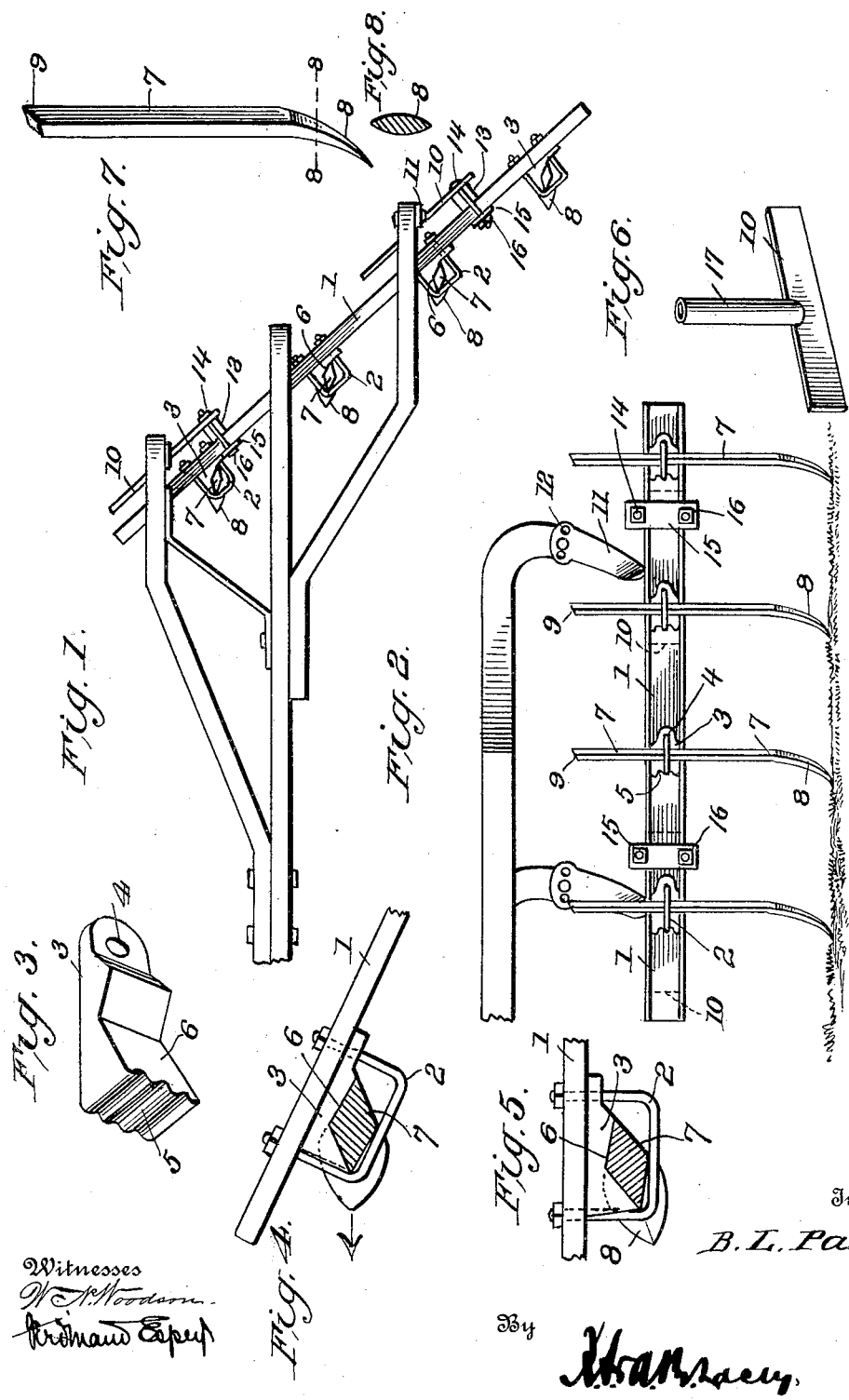
Witnesses
Inventor
B. L. Parkes:
By
Attorneys

UNITED STATES PATENT OFFICE.

BERT L. PARKES, OF MILFORD, ILLINOIS.

CULTIVATOR ATTACHMENT.

1,126,849.   Specification of Letters Patent.   Patented Feb. 2, 1915.

Application filed February 8, 1912. Serial No. 676,390.

*To all whom it may concern:*

Be it known that I, BERT L. PARKES, citizen of the United States, residing at Milford, in the county of Iroquois and State of Illinois, have invented certain new and useful Improvements in Cultivator Attachments, of which the following is a specification.

This invention has relation to cultivator attachments, and has for its objects to provide an attachment of simple form which may be easily and quickly applied to the standards of a cultivator and which may be efficiently used for cultivating the crop when the plants are small.

In this attachment the soil engaging members are so shaped and disposed that notwithstanding the fact that they operate in the soil they do not cast the same in lateral directions with relation to the line of draft of the cultivator and consequently the soil is not thrown sidewise as the cultivator passes along the rows of plants, and for this reason the plants may be cultivated while very small without danger of being covered by the soil. The soil that is disturbed during the cultivating operation rolls or falls back into the shallow furrows opened by the soil engaging members. By providing such an attachment, the weeds and objectionable plants may be removed from the soil or destroyed, while the plants of the crop are very small and this will give the crop plants an opportunity to mature early which will result in early and increased crops.

With the above object in view the attachment includes a bar upon which blocks of peculiar configuration are secured by means of clips. These blocks serve as pillows for teeth of peculiar configuration. Two of these bars are applied to the standards of a cultivator by attaching means which will be explained and means are provided for adjusting the teeth so that they may stand vertically or may have their lower portions inclined forwardly or rearwardly, as desired.

Further objects and advantages will appear in the following description, it being understood that various changes in form, proportions and minor details of construction may be resorted to within the scope of the appended claim.

For a full understanding of the invention reference is to be had to the following description and accompanying drawing, in which:

Figure 1 is a top plan view of the attachment applied; Fig. 2 is a side elevation of the same; Fig. 3 is a perspective view of a block used upon the attachment; Fig. 4 is a horizontal sectional view, showing the manner in which one of the soil engaging members is mounted; Fig. 5 is a top plan view of the same; Fig. 6 is a detail perspective view of a modified form of securing device for the attachment; Fig. 7 is a side elevation of one of the soil engaging members; Fig. 8 is a transverse sectional view of the said soil engaging member cut on the line 8—8 of Fig. 7.

Corresponding and like parts are referred to in the following description and indicated in all the views of the accompanying drawing by the same reference characters.

The attachment includes a bar 1 which may be flat or in the form of an ordinary I-beam. At suitable intervals along the length of the bar 1, clips 2 pass transversely through the same and support blocks 3. The clips 2 are preferably formed from single lengths of drawn steel rods which are bent to produce a U-shaped conformation as will be readily observed upon reference to either Figs. 4 or 5. The finished clips include a pair of spaced arm members extending in parallel relation to each other and a connecting or bight portion which extends at right angles to the arms but is arranged in parallel relation to the bar 1 when the clip is applied in the manner to be hereinafter more fully described.

The blocks 3 are provided at their forward ends with eyes 4 which are pivoted upon the forwardly disposed arms of the clips 2 and at their rear ends the blocks 3 are provided with indentations 5 (preferably three in number) which receive the rearwardly disposed arms of the clips 2. The inner faces of the blocks 3 rest directly against the side of the bar 1 and each block 3 is provided at its outer side with a recess 6 which opens at the upper and lower sides of the block. A straight line drawn from the forward to the rear edge of the recess 6 of the block 3 lies at an acute angle to the inner face of the block and the opposite walls of the recess 6 converge toward each other at equal angles.

Soil engaging members 7 at a point between their ends and at their inner sides rest in the recesses 6 of the blocks 3 so that the connecting portions of the clips 2 surround the outer sides of the soil engaging members and hold them firmly in engagement with the blocks. The soil engaging members 7 are rhombic in transverse section so that the longer transverse dimensions of the soil engaging members 7 are at acute angles to the long dimension of the bar 1. In the vicinity of their lower ends the soil engaging members 7 are flattened and pointed and curved forward slightly as at 8. The upper ends of the members 7 are straight but the extremities thereof are chamfered or beveled as at 9.

Means for connecting the bars 1 with the standards of a cultivator are provided and these means will be explained in detail hereinafter. At this time it is sufficient to say that the bar 1 is positioned at each side of the cultivator and the bars 1 are disposed at equal angles to themselves with relation to the line of draft of the cultivator and the said bars extend at acute angles with relation to the line of draft of the cultivator. Therefore the disposition of the soil engaging members upon the bars 1 is such that the long transverse dimension of the said soil engaging members 7 are parallel with the line of draft of the cultivator notwithstanding the fact that the bars are at acute angles to the said line of draft. When the curved ends 8 of the soil engaging members 7 are used for operating in the soil the parts are so assembled that the said curved ends only of the members 7 enter the soil and as these ends are flattened and curved slightly in a forward direction they stir the soil at the surface and cut out young plants, but as the cultivator moves along a row this material rolls back into the furrows cut by the soil engaging members 7 and the said material is not cast or thrown in sidewise directions with relation to the members 7. Consequently the said members may operate in close proximity to a row of small plants without danger of casting the material upon the plants of the crop. If it should be desired to operate at considerable depth in the soil, the positions of the bars 1 are inverted so that the straight ends of the members 7 will operate in the soil and the beveled extremities 9 thereof will afford sufficient room to permit the material that is stirred at the surface of the soil to roll back into the furrows.

The attaching means for the bars consists of a strip 10 which is supported by a shank 11. The long dimension of the shank 11 is disposed at a right angle to the long dimension of the strip 10. However, the sides of the shank 11 are not in the same vertical plane as the sides of the strip 10, but are disposed at approximately the same angle as the angle of disposition of the long dimension of the bars 1 with relation to the line of draft of the cultivator. The shank 11 is provided at its upper end with a series of perforations 12 through which a bolt may be inserted, whereby the said shank is secured to the standard of the cultivator. Several of the shanks 11 are provided upon each bar 1 so that the said bar may be braced at its forward and rear end portions upon the cultivator. A block 13 is interposed between the strip 10 and the bar 1 and a clip 14 passes around the bar 1 and a plate 15 is located over the end portions of the said clip and lies against the side of the bar 1. Nuts 16 are screw threaded upon the ends of the clip 14 and clamp the plate 15 against the bar 1 and the strip 10 against the block 13.

In some forms of cultivators where tubular standards are employed, the strip 10 is provided with a stud 17 which is slipped in the lower end of the cultivator standard and clamped therein by any suitable means.

Having thus described the invention, what is claimed as new is:

The combination with a cultivator including a beam arranged at an acute angle with relation to the line of draft of the cultivator and having soil engaging members substantially rhombic in cross-section, of attaching means for said members, said means each including a clip arranged on the beam having spaced parallel arms and a connecting portion extending at right angles to said arms, the connecting portion of the clip being arranged parallel with the beam, a block supported by the clip and formed with a straight rear face arranged to contact with the beam, said block having a recess formed in its outer side, the walls of which recess extend at unequal angles to the rear face of the block, each of said members being engaged between the block and the connecting portion of the clip with the long transverse dimension of the member disposed at an acute angle to the obliquely disposed beam and in alinement with the line of draft upon the cultivator, said member being seated within the recess of the block with two sides of the member sitting flat against the walls of the recess and a third side of the member sitting flat against the connecting portion of the clip.

In testimony whereof I affix my signature in presence of two witnesses.

BERT L. PARKES. [L. S.]

Witnesses:
E. S. HERRON,
G. F. PATTERSON.

Copies of this patent may be obtained for five cents each, by addressing the "Commissioner of Patents, Washington, D. C."